United States Patent
Huang (10) Patent No.: US 6,728,189 B2
(45) Date of Patent: Apr. 27, 2004

(54) DISK LOADER

(75) Inventor: Wei-Yu Huang, Taoyuan (TW)

(73) Assignee: Industrial Technology Research Institute, Hsinchu (TW)

( * ) Notice: Subject to any disclaimer, the term of this patent is extended or adjusted under 35 U.S.C. 154(b) by 686 days.

(21) Appl. No.: 09/735,958

(22) Filed: Dec. 13, 2000

(65) Prior Publication Data

US 2002/0036968 A1 Mar. 28, 2002

(30) Foreign Application Priority Data

Sep. 22, 2000 (TW) .......................................... 89119588 A (51) Int. Cl.[7] .............................................. G11B 33/02
(52) U.S. Cl. ...................................... 369/75.2; 369/75.1
(58) Field of Search ............................. 369/75.1, 75.2, 369/270

(56) References Cited

U.S. PATENT DOCUMENTS 6,002,658 A * 12/1999 Aso et al. ................... 369/75.1
6,341,114 B1 * 1/2002 Nguyen et al. ............. 369/77.1
6,438,087 B2 * 8/2002 Omori ........................ 369/75.2
2001/0010674 A1 * 8/2001 Ahn .......................... 369/75.2

* cited by examiner

Primary Examiner—David L. Ometz
Assistant Examiner—Mark Blouin
(74) Attorney, Agent, or Firm—W. Wayne Liauh (57) ABSTRACT

In an optical disc driver having a fixed opto-mechanic module and turntable, a disc loader includes a retractable tray for moving the optical disc into and out of the unit. The optical disc loader includes a base for mounting thereon a driving unit and a motor spinning disc; a movable tray actuated by the driving unit to linearly move into and out of the loader; a disc platform connected to the movable tray and moved therewith for loading, lifting, descending and retracting the optical disc; and a pressing unit connected to the disc platform, to be lifted and descended therewith, for pressing the optical disc to the motor spinning disc. Therefore, it saves space, simplifies the mechanism, decreases the number of components and simplifies the manufacturing process.

12 Claims, 10 Drawing Sheets

DISK LOADER

BACKGROUND OF THE INVENTION

1. Field of Invention

The present invention generally relates to an optical disc loader, and more particularly relates to an optical disc loader, which includes a retractable tray for moving the optical disc into and out of an optical disc driver.

2. Related Art

In prior arts of optical disc drivers, an optical disc loader generally includes a complicated lifting device to move the opto-mechanic module, called mecha, onto a turntable for playing an optical disc laid thereon, and lift it from the turntable for ejection of the disc. The strict limitation of space and precision of movement make the mechanism and timing control more difficult and complicated.

In a prior art of U.S. Pat. No. 4,607,361, a disc player has a housing and a frame fixed within the housing in which a turntable is rotatably journalled about a vertical axis. The loading mechanism comprises a drawer, which is rectilinearly slidable inward and outward through a front opening in the housing, between an opened (extended) and a closed (retracted) position. The drawer carries a platform for carrying a disk to the turntable. The platform is movable between an upper and a lower position in the direction of height with respect to the drawer, whereby the platform in the lower position is located below the upper side of the turntable. The loading mechanism further comprises a pressure lever with a disk loader for pressing a disc against the turntable. Since there is not a guiding element to ensure the platform of vertical lift from the turntable, in the operation of the platform during moving up, the optical disc can only be guided by the center post of the turntable. This is easy to cause jam of the disc on the center post.

Besides, the pressure lever of the aforesaid mechanism is pivotally mounted for swinging up and down and occupies more space in the direction of height, which makes larger dimensions of the disc driver.

SUMMARY OF THE INVENTION

The primary object of the present invention is therefore to provide an optical disc loader in which the mecha (opto-mechanic module) and turntable are fixed. The optical disc is supported by a platform, which is vertically movable to engage with and move apart from the turntable. A press plate is also engaged with the platform and movable along with the platform. Therefore, it solves the problem of aforesaid prior art to save space, simplifies the mechanism, decreases the number of components and simplifies the manufacturing process.

To achieve the aforesaid object, an optical disc loader according to the present invention includes a base for mounting thereon a driving unit and a motor spinning disc; a movable tray actuated by the driving unit to linearly move into and out of the loader; a disc platform connected to the movable tray and moved therewith for loading, lifting, descending and ejecting the optical disc; and a pressing unit connected to the disc platform, to be lifted and descended therewith, for pressing the optical disc to the motor spinning disc.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The present invention relates to an optical disc loader of an optical disc driver. The optical disc loader carries an optical disc to move into and move out of the disc driver.

Figure 1:
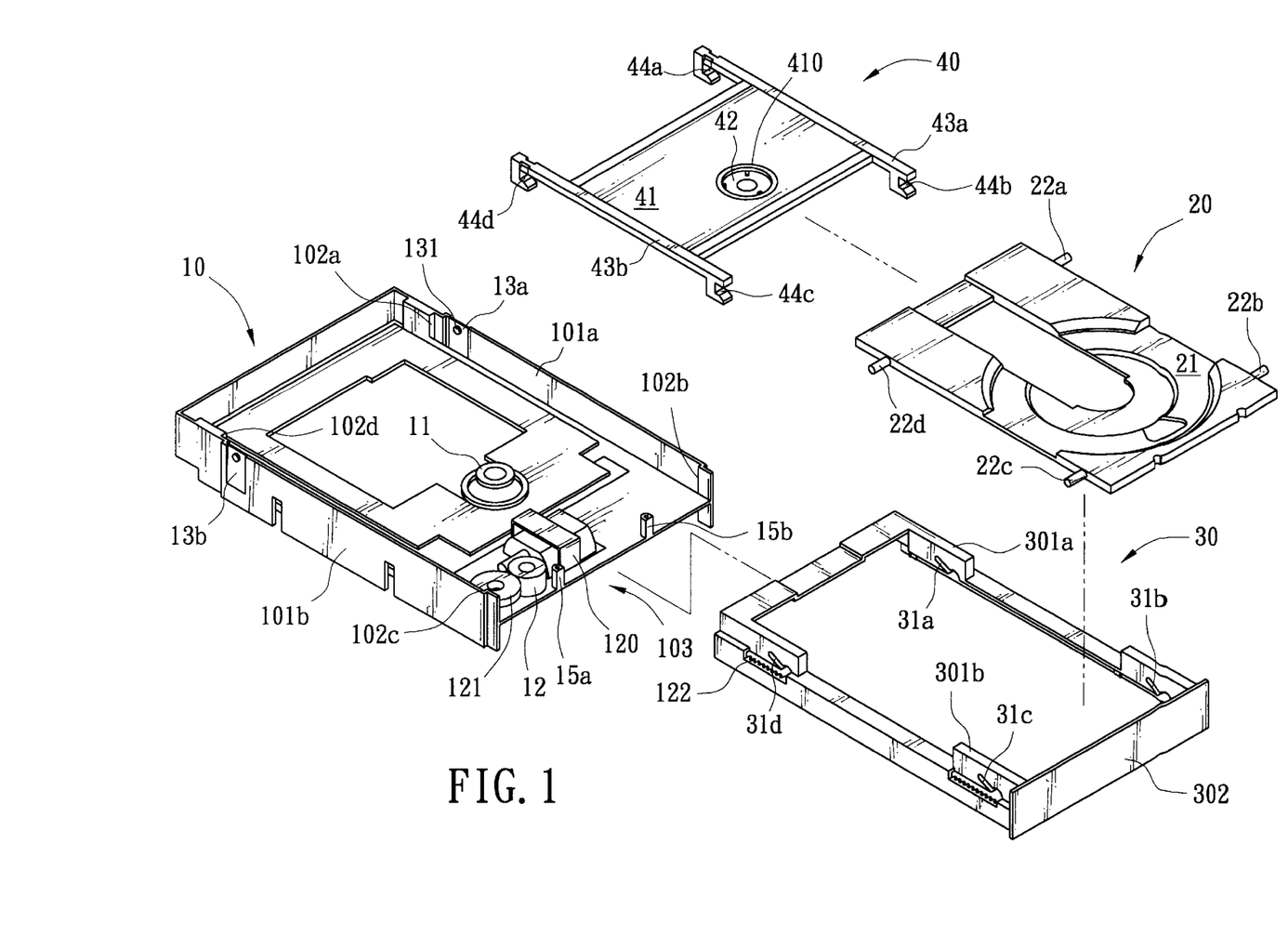
FIG. 1 is an exploded view of an optical disc loader according to the present invention.

As shown in FIG. 1, the optical disc loader mainly includes a base 10, a disc platform 20, a movable tray 30 and a pressing unit 40. The disc platform 20 is for carrying an optical disc. The disc platform 20 is mounted on the movable tray 30, and movable with the tray 30 between an ejection position to eject the disc and a loading position to load the disc. When the disc platform 20 moving along with the movable tray 30 into the base 10, the tray 30 will activate the disc platform 20 and the pressing unit 40 to lift and descend synchronously, so as to place the optical disc on a motor spinning disc 11 mounted on the base 10, or to release the optical disc from the motor spinning disc 11 for further being ejected from the base 10 by movement of the movable tray 30.

Figure 2A:
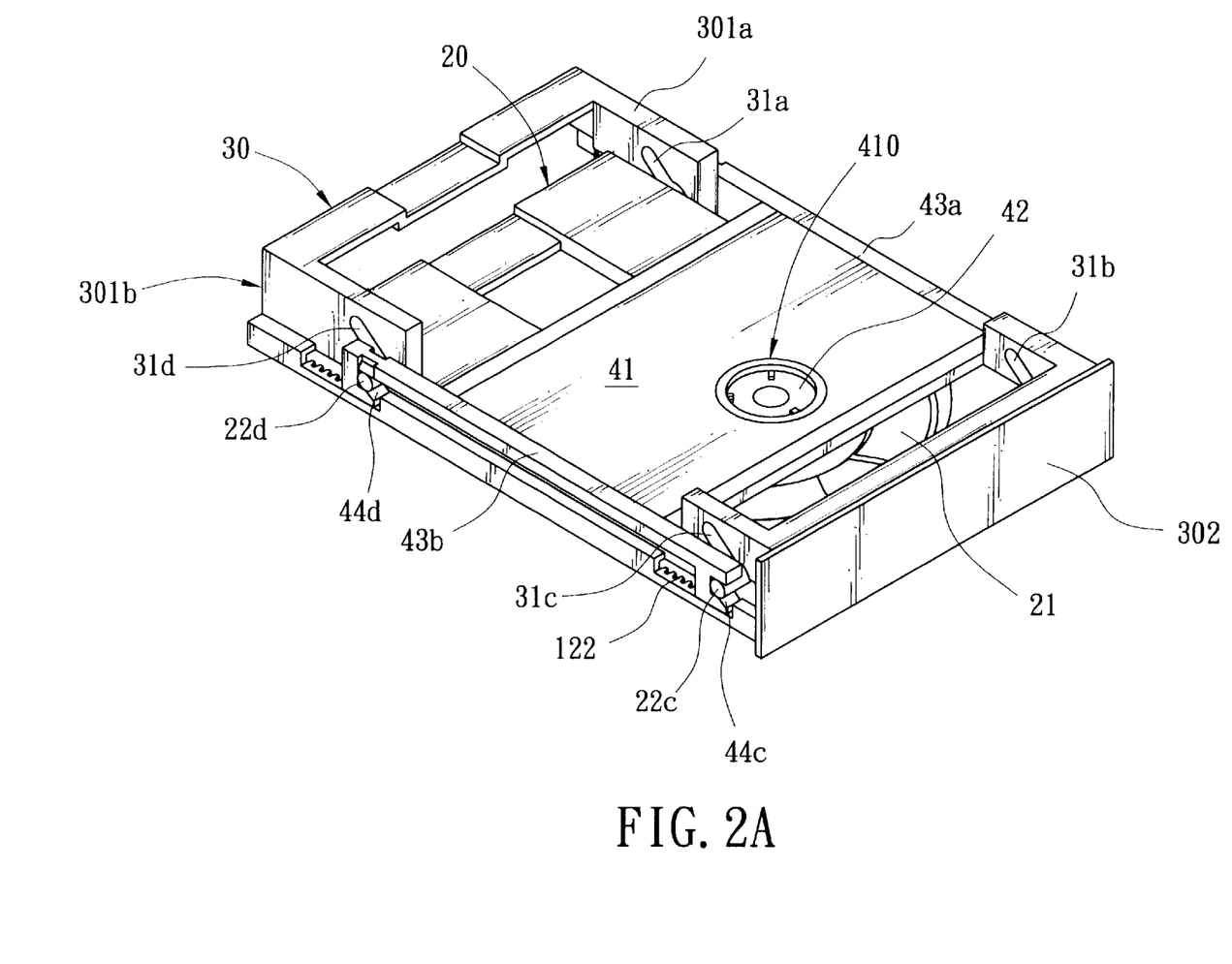
FIG. 2A is a perspective view of the present invention showing the movable tray retracting into the base and actuating the disc platform descending to an engagement position.
Figure 3A:
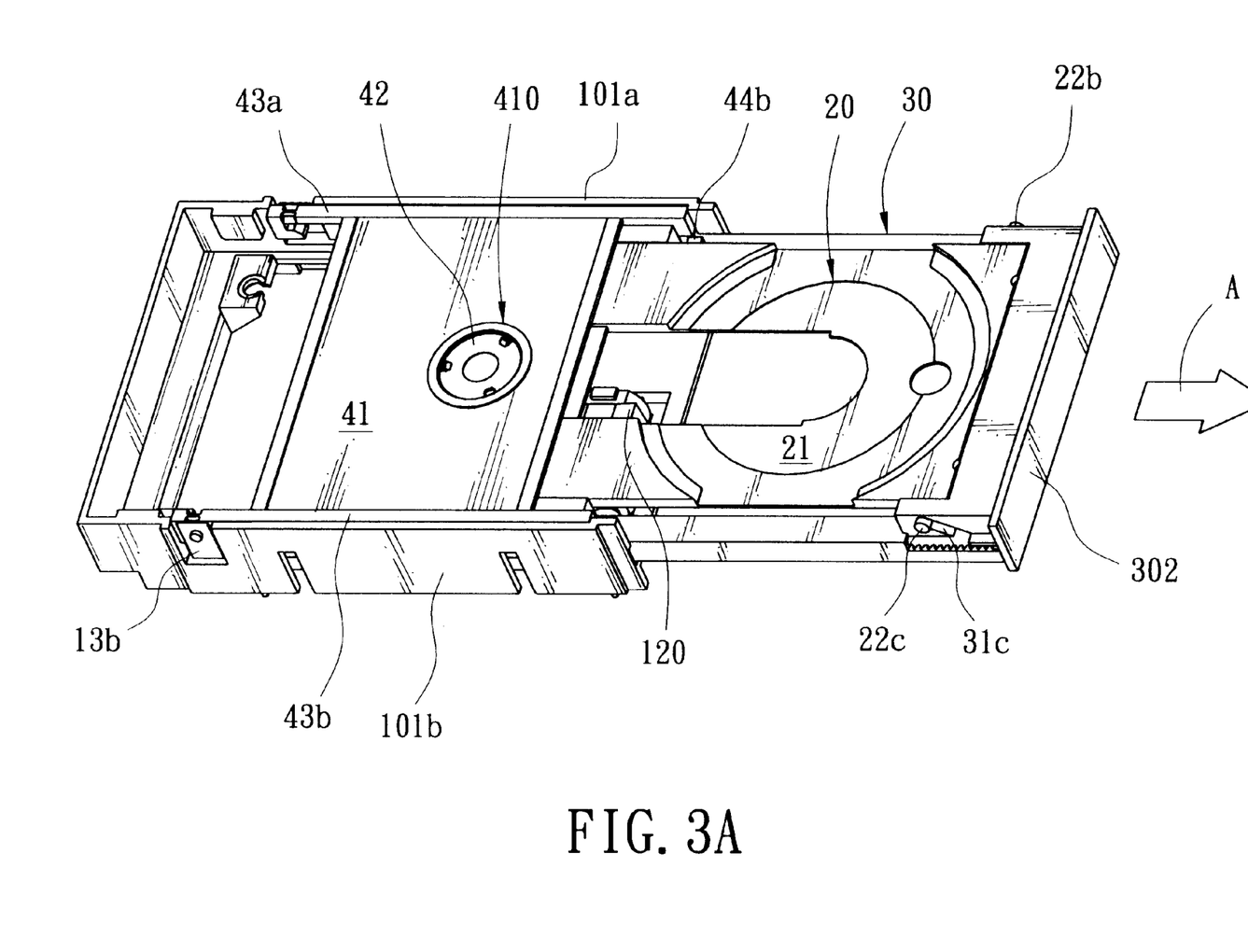
FIG. 3A is a perspective view of the present invention showing the disc platform lifting to the release position, and the movable tray carrying the disc platform totally ejecting out of the base.

The base 10 is substantially a box-like element having a left wall 101a and a right wall 101b formed along the moving direction of the movable tray 30. An entrance 103 is formed on one end of the left wall 101a and the right wall 101b for the movable tray 30 to move in. The motor spinning disc 11 is located inside the base 10 and controlled to rotate by unshown driving elements. A driving unit 12 is used to drive the movable tray 30 moving outwards and inwards between the ejection position (see FIG. 3A) for ejecting the disc and the loading position (see FIG. 2A) for loading the disc. The driving unit 12 includes a motor 120, reduction gears 121 and a rack 122 mounted on the movable tray 30 and engaged with the reduction gears 121. The motor spinning disc 11 is mounted on the base 10 at a suitable position for rotating the optical disc 50 loaded thereon.

Figure 2B:
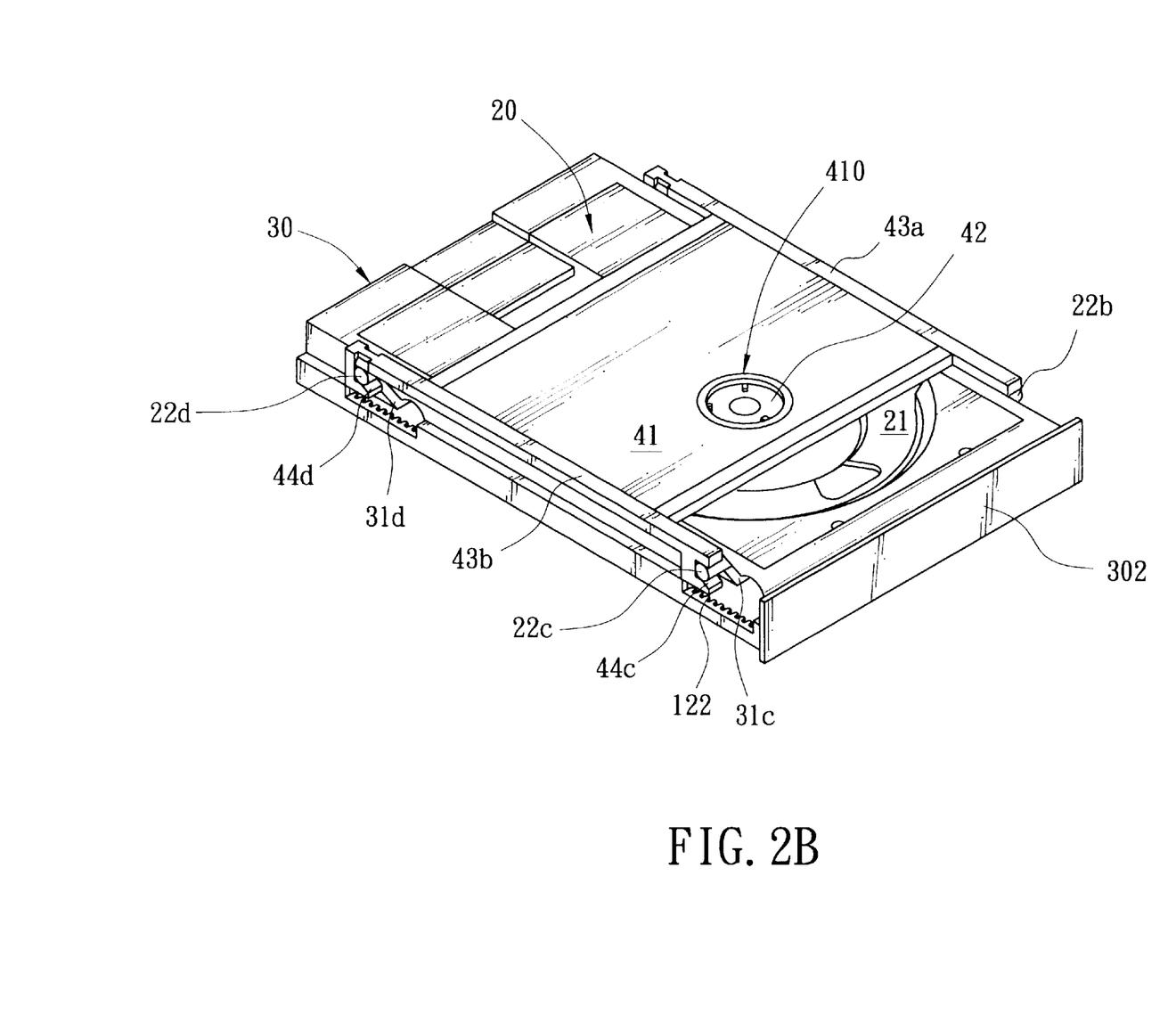
FIG. 2B is a perspective view of the present invention showing the movable tray starting to eject from the base and actuating the disc platform lifting to a release position.

The disc platform 20 is formed with a carrier plane 21 for carrying an optical disc 50. The carrier plane 21 is formed with a hollow center. A plurality of couplers 22a, 22b, 22c, 22d extrude outwards from two sides of the disc platform 20. The disc platform 20 can remain in a horizontal position and move, along the axial direction of the motor spinning disc 11, between a lower engagement position and a higher release position. In the engagement position, the carrier plane 21 of the disc platform 20 is lower than the motor spinning disc 11 so that the optical disc 50 is placed on the motor spinning disc 11. On the contrary, the optical disc is lifted by the carrier plane 21 when the disc platform 20 lifting above the motor spinning disc 11 to the release position as shown in FIG. 2B.

The movable tray 30 is substantially a square frame mounted around the disc platform 20. The movable tray 30 at least includes a left wall 301a and a right wall 301b located in the movement direction of the tray 30; and a front panel 302 for connecting the two walls 301a, 301b. A plurality of guiding grooves 31a, 31b, 31c, 31d are formed on the two walls 301a, 301b for engaging with the couplers 22a, 22b, 22c, 22d of the disc platform 20. The guiding grooves 31a, 31b, 31c, 31d have openings at the ejection direction of tray 30, and extend backwards and upwards so as to receive and guide the plurality of couplers 22a, 22b, 22c, 22d of the disc platform 20 for converting the horizontal movement of the tray 30 into vertical movement of the disc platform 20 between the engagement and release positions.

Figure 5A:
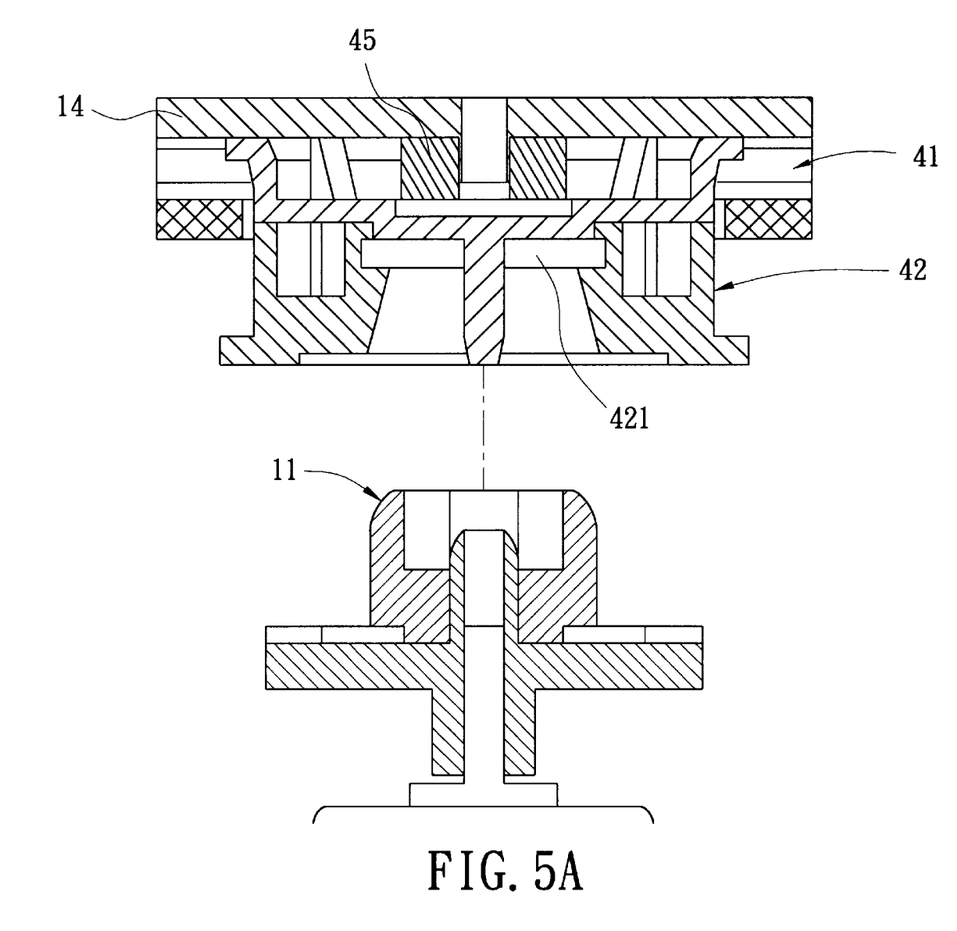
FIG. 5A is a first embodiment of a pressing portion of the present invention utilizing a magnet.
Figure 5B:
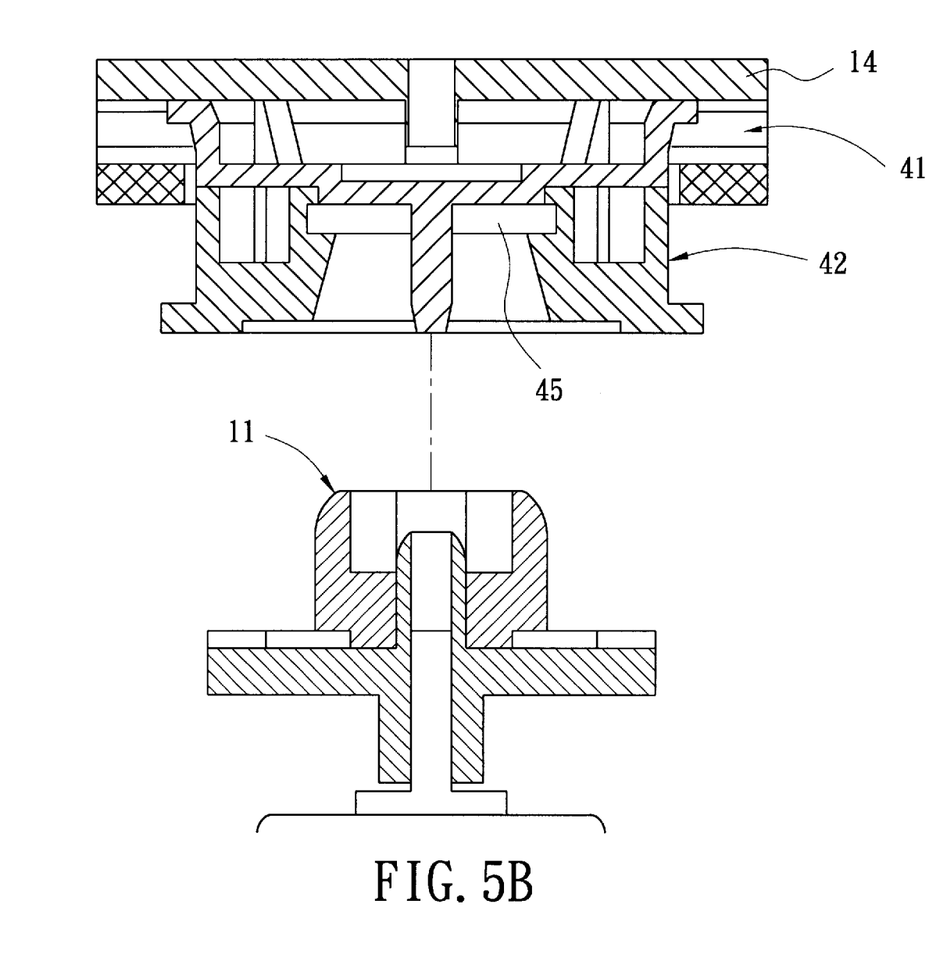
FIG. 5B is a second embodiment of a pressing portion of the present invention utilizing a magnet.
Figure 6:
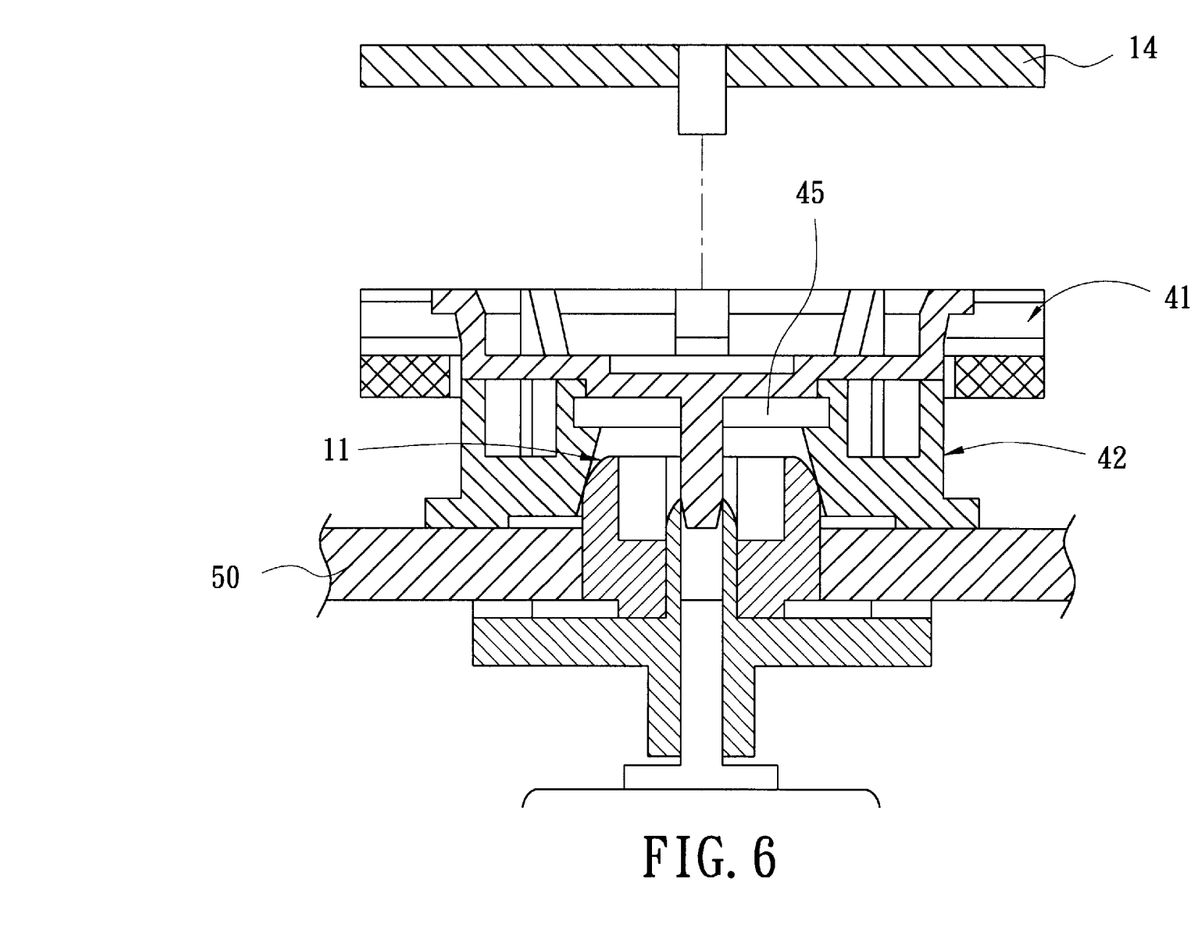
FIG. 6 is a partial sectional view of the present invention showing the pressing portion pressing, with its weight, the optical disc to the motor spinning disc.

The pressing unit 40 includes a supporting plate 41 and a pressing portion 42 suspended to the supporting plate 41. The pressing portion 42 is suspended in a hole 410 formed on the supporting plate 41 and vertically movable therein. The supporting plate 41 overlaps on the disc platform 20, so that, as shown in FIG. 6, the pressing portion 42 can press an optical disc 50 on the motor spinning disc 11 by its own weight when the supporting plate 41 pressing on the disc platform 20. The supporting plate 41 further includes a left supporting arm 43a and a right supporting arm 43b formed on left and right sides thereof along the movement direction of the tray 30. Four clamp portions 44a, 44b, 44c, 44d are formed on ends of the supporting arms 43a, 43b. The distance between the supporting arms 43a, 43b is a little bit larger than the width of the movable tray 30. The bottom of the supporting arms 43a, 43b are surfaces matching with the couplers 22a, 22b, 22c, 22d of the disc platform 20. That is, the couplers 22a, 22b, 22c, 22d are long enough to pass through the guiding grooves 31a, 31b, 31c, 31d of the movable tray 30 as further extrude outwards. The opening of the clamp portions 44a, 44b, 44c, 44d face to the ejection direction of the movable tray 30, so that when the disc platform 20 being activated by the movable tray 30 to vertically move to the motor spinning disc 11, the couplers 22a, 22b, 22c, 22d will always engage with the clamp portions 44a, 44b, 44c, 44d. And, the supporting plate 41 and pressing portion 42 will move downwards, as shown in FIG. 6, to press the optical disc 50 with its own weight when the pressing unit 40 descending to the disc platform 20. On the contrary, when the pressing unit 40 moves upwards along with the disc platform 20 to the release position, as shown in FIGS. 5A, 5B, the pressing portion 42 will be attracted by magnetic force of a magnet 45 to a magnetic element 421 and released from the surface of the optical disc 50. When the disc platform 20 moving along with the movable tray 30 to the ejection position, the couplers 22a, 22b, 22c, 22d will leave the clamp portions 44a, 44b, 44c, 44d, but only the couplers 22a, 22d move along the bottom surface of left and right supporting arms 43a, 43b. Meanwhile, the back corners of the supporting plate 41 are supported by two holders 13a, 13b fixed on the base 10 to maintain its height and being prevented from incline or falling.

Figure 4A:
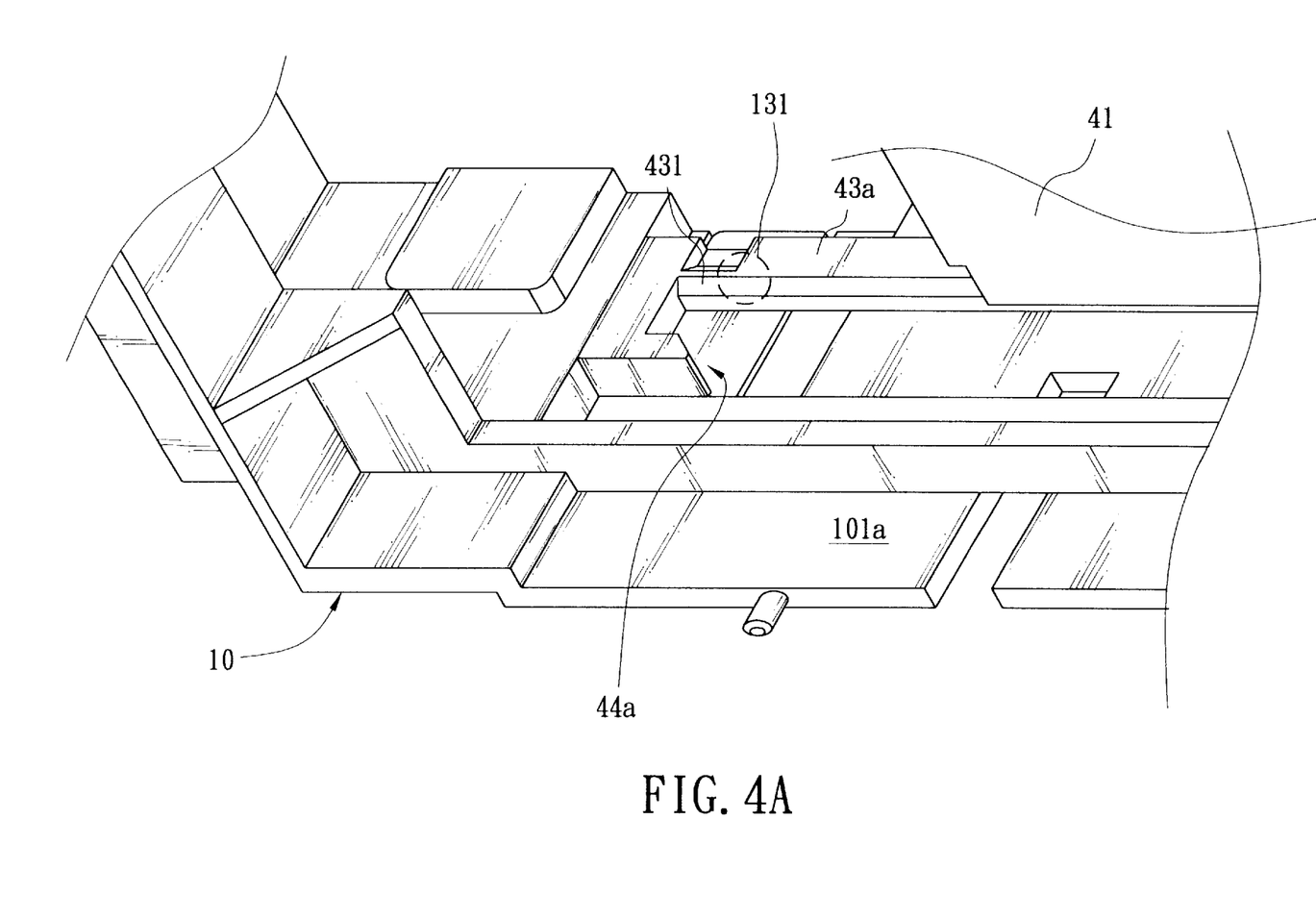
FIG. 4A is a partial view of the present invention showing the relationship of a left supporting arm and an extrusion of a holder during lifting of the supporting plate.
Figure 4B:
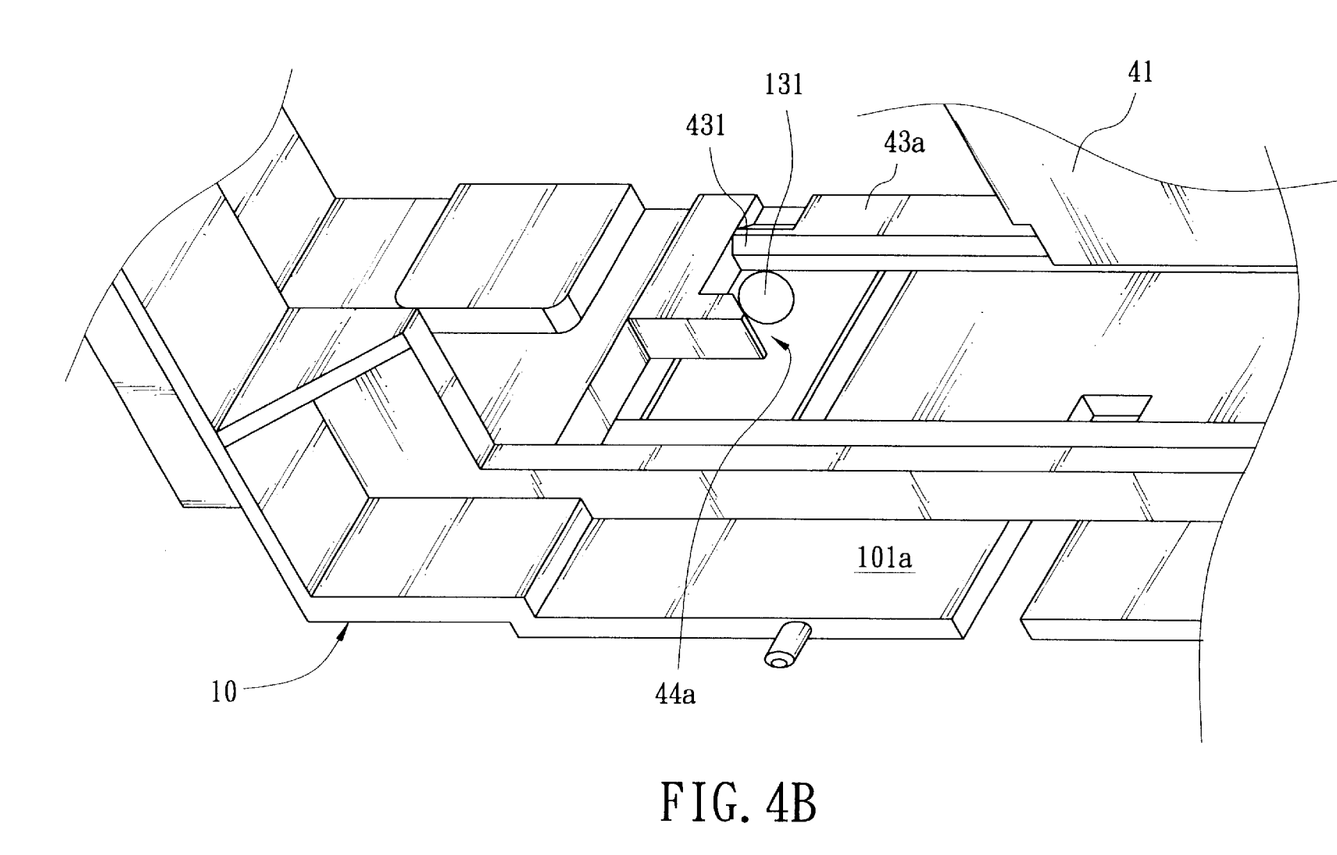
FIG. 4B is a partial view of the present invention showing the extrusion of holder supporting the bottom rim of the left supporting arm when the supporting plate lifting to the release position.

The holders 13a, 13b are resilient plates fixed on left wall 101a and right wall 101b of the base 10. One end of the holders 13a, 13b is fixed on the left wall 101a or right wall 101b, while the outer end is an extrusion 131 extending to the left or right supporting arm 43a, 43b. The extrusions 131 fall in the movement paths of the supporting arm 43a, 43b so that when the two supporting arms 43a, 43b moving upwards along with the supporting plate 41 to close to the release position of the disc platform 20, the holders 13a, 13b are pushed outwards by the supporting arms 43a, 43b, as shown in FIG. 4A. Till the supporting plate 41 arriving the release position of the disc platform 20, the extrusions 131 are released inwards to support the bottom surfaces of the left and right supporting arms 43a, 43b, as shown in FIG. 4B. The extrusions 131 and the aforesaid couplers 22a, 22d supporting on the bottom of the supporting arms 43a, 43b will prevent the pressing unit 40 from falling. On the contrary, when the disc platform 20 further retracting along with the movable tray 30 into the base 10, the couplers 22a, 22b, 22c, 22d engage again with the clamp portions 44a, 44b, 44c, 44d. By force of downward movement of the disc platform 20 and the supporting plate 41 activated by the movable tray 30, the supporting arms 43a, 43b will pass over the extrusions 131 of the holders 13a, 13b again. In order to smooth the supporting plate 41 passing upwards over the extrusions 131 of the holders 13a, 13b, the top rims of the supporting arms 43a, 43b can be furnished with fillets 431.

The magnet 45 can be applied in different ways. For example, in FIG. 5A, the magnet 45 is mounted in the upper cover 14 of the base 10. A magnetic element 421, such as ferric plate, is mounted inside the pressing portion 42. Therefore, when the pressing unit 40 moving upwards along with the disc platform 20 to the release position, the pressing portion 42 will be attracted by the magnet 45 and stay with the upper cover 14. So, when the optical disc 50 and disc platform 20 moving outwards from the base 10, the disc 50 won't interfere with the pressing portion 42. In another embodiment shown in FIG. 5B, the upper cover 14 is made of ferric material, and the magnet 45 is fixed in the pressing portion 42, so as to attain the same function.

In order to prevent the supporting plate 41 of the pressing unit 40 from being biased or stuck, a plurality of couplers 22a, 22b, 22c, 22d and corresponding guiding grooves 31a, 31b, 31c, 31d are formed respectively on peripherals of the disc platform 20 and the movable tray 30. Moreover, a plurality of guiding surfaces 102a, 102b, 102c, 102d are formed on the left and right walls 101a, 101b of the base 10 for constraining the supporting plate 41 moving only in the axial direction of the motor spinning disc 11. In the embodiments shown in the drawings, the guiding surfaces 102a, 102b, 102c, 102d are of right angular surfaces. But, certainly other shapes can be applied for the same function.

Figure 3B:
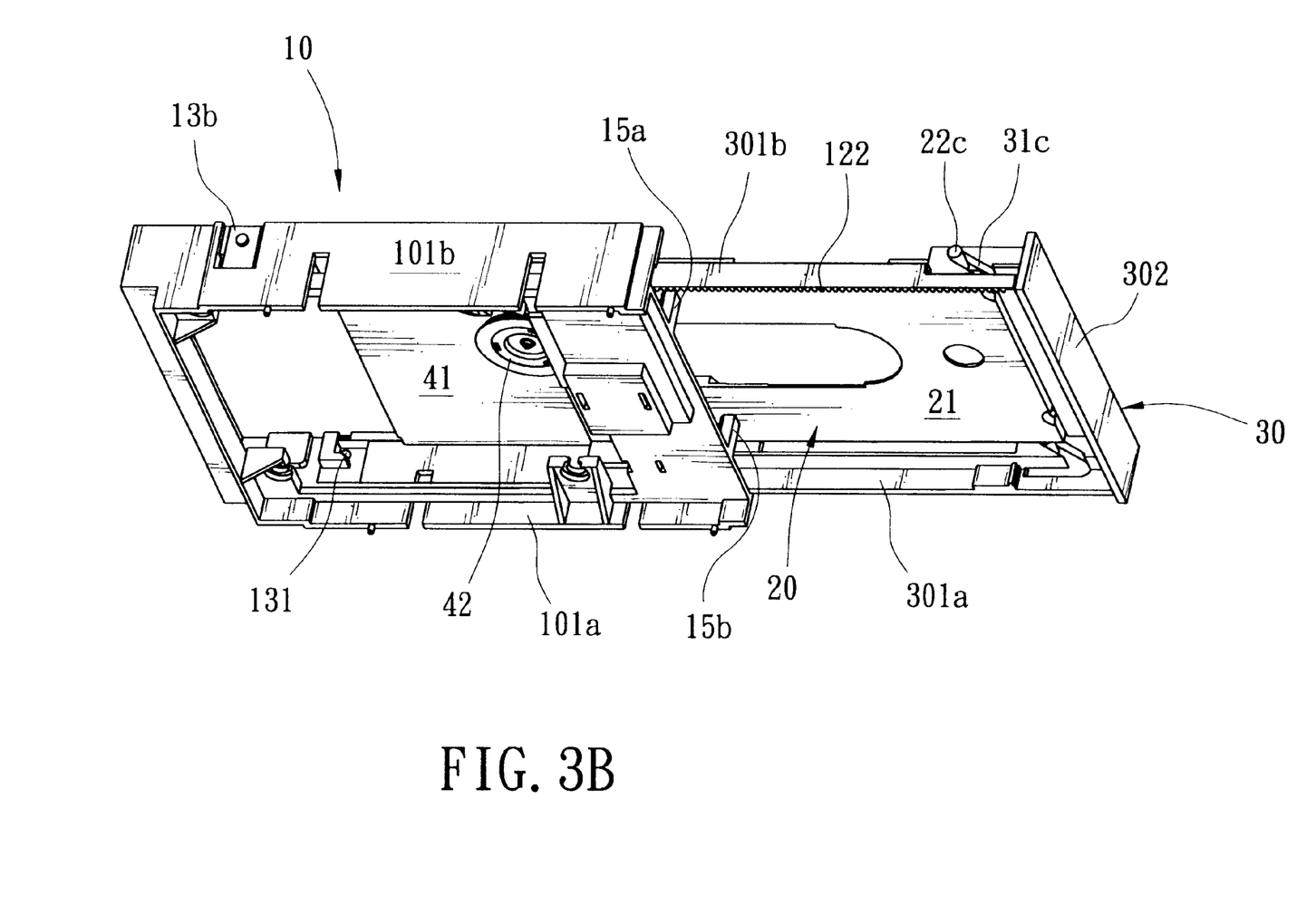
FIG. 3B is a perspective view taken from bottom side of the present invention showing the disc platform being stopped by stoppers located at the bottom side.

Further, a pair of stoppers 15a, 15b can be formed on the base 10 at the vicinity to the entrance of the movable tray 30. The stoppers are used to constrain the disc platform 20 moving only in the axial direction of the motor spinning disc 11 before the disc platform 20 reaching the release position as arriving the top of the guiding grooves 31a, 31b, 31c, 31d. After the disc platform 20 reaching the release position, the stoppers 15a, 15b will support the bottom surface of the disc platform 20, as shown in FIG. 3B, to prevent it from falling during moving outwards from the base 10. Of course, the shape of the stoppers 15a, 15b is not limited to column that other shapes, such as plates, can be applied. The only factor is that they shouldn't interfere the movement of the disc platform 20 and movable tray 30.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical disc loader comprising:

a base, having a driving unit, an upper cover and a motor spinning disc mounted on the base;

a disc platform, having a carrier plane formed with a hollow hole in the center for carrying an optical disc, and a plurality of couplers evenly formed on periphery of the carrier plane;

said disc platform is capable of moving, along axial direction of said motor spinning disc, between a lower engagement position to place said optical disc on said motor spinning disc and a higher release position to lift said disc;

a movable tray, driven by said driving unit, to be movable between an ejection position as moving outwards and a loading position as retracting inwards;

said movable tray having a left wall and a right wall formed with a plurality of guiding grooves corresponding to said couplers of said disc platform;

said guiding grooves incline upwards in the retracting direction of said movable tray so as to activate said disc platform moving downwards to said engagement position when said movable tray moving inwards to said loading position, and activate said disc platform moving upwards to said release position when said movable tray moving outwards to said rejection position;

a pressing unit, having a supporting plate and a pressing portion suspended thereto for pressing said optical disc to said motor spinning disc;

said supporting plate, overlapping to said disc platform, having a left supporting arm and a right supporting arm formed with clamp portions on left and right sides thereof along the movement direction of said movable tray;

said clamp portions having opening facing to the ejection direction of said movable tray, so that when said disc platform being activated by said movable tray to vertically move to said motor spinning disc, said couplers are engaged with said clamp portions to move said supporting plate and said pressing portion downwards to press said optical disc, and, when said pressing unit moving upwards to said release position, said couplers are movable away from said clamp portion along with movement of said disc platform;

a magnet for attracting said pressing portion to said upper cover of said base when said pressing unit being in said release position; and holders, fixed on said base, for retaining said pressing unit in said release position.

2. An optical disc loader as recited in claim 1 wherein said driving unit includes a motor, reduction gears, and a rack mounted on said movable tray and engaged with said reduction gears.

3. An optical disc loader as recited in claim 1 wherein left and right sides of said base are formed with guiding surfaces for guiding said supporting plate moving only in axial direction of said motor spinning disc.

4. An optical disc loader as recited in claim 1 wherein said guiding grooves comprise openings formed in the ejection direction of said movable tray, and extend backwards and upwards so as to receive and guide the plurality of couplers of said disc platform for converting horizontal movement of said tray into vertical movement of said disc platform between the engagement and release positions.

5. An optical disc loader as recited in claim 1 wherein a distance between said left and right supporting arms is a little bit larger than width of said movable tray; bottom surfaces of said supporting arms are matching with said couplers of said disc platform; said opening of said clamp portions face to ejection direction of the movable tray, so that said couplers are movable along said bottom surfaces of supporting arms and engageable with sad clamp portions.

6. An optical disc loader as recited in claim 1 wherein a pair of stoppers are formed on said base at the vicinity to entrance of said movable tray, so as to constrain said disc platform moving only in axial direction of said motor spinning disc before said disc platform moving up and reaching said release position, and support a bottom surface of said disc platform to prevent the same from falling during moving outwards from said base.

7. An optical disc loader as recited in claim 1 wherein said pressing portion of said pressing unit is suspended to said supporting plate in a hole formed thereon, and vertically movable therein, so as to press an optical disc on said motor spinning disc by its own weight when said supporting plate pressing on said disc platform.

8. An optical disc loader as recited in claim 1 wherein said magnet is mounted in said upper cover of said base, for attracting a magnetic element mounted inside said pressing portion, so as to hold said pressing portion with said upper cover when said pressing unit moving upwards along with said disc platform to said release position.

9. An optical disc loader as recited in claim 8 wherein said magnetic element is a ferric plate.

10. An optical disc loader as recited in claim 1 wherein said upper cover is made of magnetic material; said magnet is mounted in said pressing portion, so as to attract said upper cover and hold said pressing portion with said upper cover when said pressing unit moving upwards along with said disc platform to said release position.

11. An optical disc loader as recited in claim 1 wherein holders are resilient plates having one end fixed to side walls of said base, and other end formed with an extrusion extending to said left and right supporting arms, said extrusions fall in movement paths of said supporting arms, so as to be pushed outwards thereby when said left and right supporting arms moving upwards along with said supporting plate to close to said release position of said disc platform, and released inwards to support said bottom surfaces of said left and right supporting arms till said supporting plate arriving said release position, therefore, said extrusions and said couplers of said disc platform supporting on bottom surfaces of said supporting arms prevent said pressing unit from falling.

12. An optical disc loader as recited in claim 11 wherein top rims of said supporting arms are furnished with fillets to smooth said supporting plate passing upwards over said extrusions of holders.

* * * * *